(12) United States Patent
Nicot

(10) Patent No.: US 6,593,733 B1
(45) Date of Patent: Jul. 15, 2003

(54) PROTECTIVE DEVICE FOR MAGNETIC CODER

(75) Inventor: Christophe Nicot, Epagny (FR)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/175,266

(22) Filed: Oct. 20, 1998

(30) Foreign Application Priority Data

Nov. 28, 1997 (FR) .............................. 97 14984

(51) Int. Cl.$^7$ ................................. G01B 7/30
(52) U.S. Cl. ................................. 324/207.25
(58) Field of Search ............... 335/296–306; 310/152–156; 324/207.25

(56) References Cited

U.S. PATENT DOCUMENTS

| | | | | |
|---|---|---|---|---|
| 1,689,843 A | * | 10/1928 | Rutter | 324/137 |
| 3,629,756 A | * | 12/1971 | Holtz | 335/285 |
| 3,670,408 A | * | 6/1972 | Sims | 29/602.1 |
| 3,842,379 A | * | 10/1974 | Barnett | 335/297 |
| 4,990,877 A | * | 2/1991 | Benesch | 335/301 |
| 5,010,290 A | | 4/1991 | Foster | 324/173 |
| 5,289,149 A | * | 2/1994 | Nishita et al. | 335/212 |
| 5,367,278 A | * | 11/1994 | Yoshikawa | 335/285 |
| 5,431,413 A | | 7/1995 | Hajzler | 277/2 |
| 5,581,224 A | * | 12/1996 | Yamaguchi | 333/185 |
| 5,621,369 A | * | 4/1997 | Gardner et al. | 335/302 |
| 5,642,042 A | | 6/1997 | Goossens et al. | 324/173 |
| 5,685,065 A | * | 11/1997 | Suzuki et al. | 123/634 |
| 6,398,032 B2 | * | 6/2002 | Fosnight et al. | 206/711 |

FOREIGN PATENT DOCUMENTS

EP 0 669 534 A1 8/1995

* cited by examiner

Primary Examiner—Ramon M. Barrera
(74) Attorney, Agent, or Firm—Michael Best & Friedrich LLP

(57) ABSTRACT

A device for a magnetic encoder, the magnetic encoder being designed to work with a sensor to measure the rotation of a rotating element, wherein a protective element, whose shape is designed to cover the active face of the magnetic encoder, is placed on the magnetic encoder during the storage, handling or shipment phases of the magnetic encoder.

8 Claims, 4 Drawing Sheets

PROTECTIVE DEVICE FOR MAGNETIC CODER

BACKGROUND OF THE INVENTION

This invention relates generally to a protective device for a magnetic encoder and, more particularly, to a protective device for a magnetic encoder for use during storage or shipment, with the magnetic encoder being designed to work with a sensor to measure the rotation of a turning element.

Devices used to measure the rotation of a rotating element typically consist of a sensor that is kept stationary in relation to a measurement referential and a magnetic encoder driven in rotation by a rotating element, with the sensor being located in the immediate vicinity of the magnetic encoder and cooperating with the magnetic encoder to supply a signal to an electronic processor for data processing. A disadvantage of this type of device is that the active face of the magnetic encoder opposite the sensor, which is a multipolar magnetic surface, may not function properly due to damage from shock or due to the deposit of particles, specifically those of a ferromagnetic nature, occurring during storage or during transport of the magnetic encoder.

The foregoing illustrates limitations known to exist in present devices and methods. Thus, it is apparent that it would be advantageous to provide an alternative directed to protecting a magnetic encoder during storage and transport, especially an alternative that is, not cumbersome, that is easy to assemble, and that ensures protection of the active face of the magnetic encoder with respect to shock and deposit of ferromagnetic particles. Accordingly, a suitable alternative is provided, including features more fully disclosed hereinafter.

SUMMARY OF THE INVENTION

In one aspect of the invention, this is accomplished by providing a

The foregoing and other aspects will become apparent from the following detailed description of the invention when considered in conjunction with the accompanying drawing figures.

BRIEF DESCRIPTION OF THE DRAWING FIGURES

For easy reading of the drawings, similar elements have the same reference numbers from one figure to the next.

DETAILED DESCRIPTION

Figure 1:
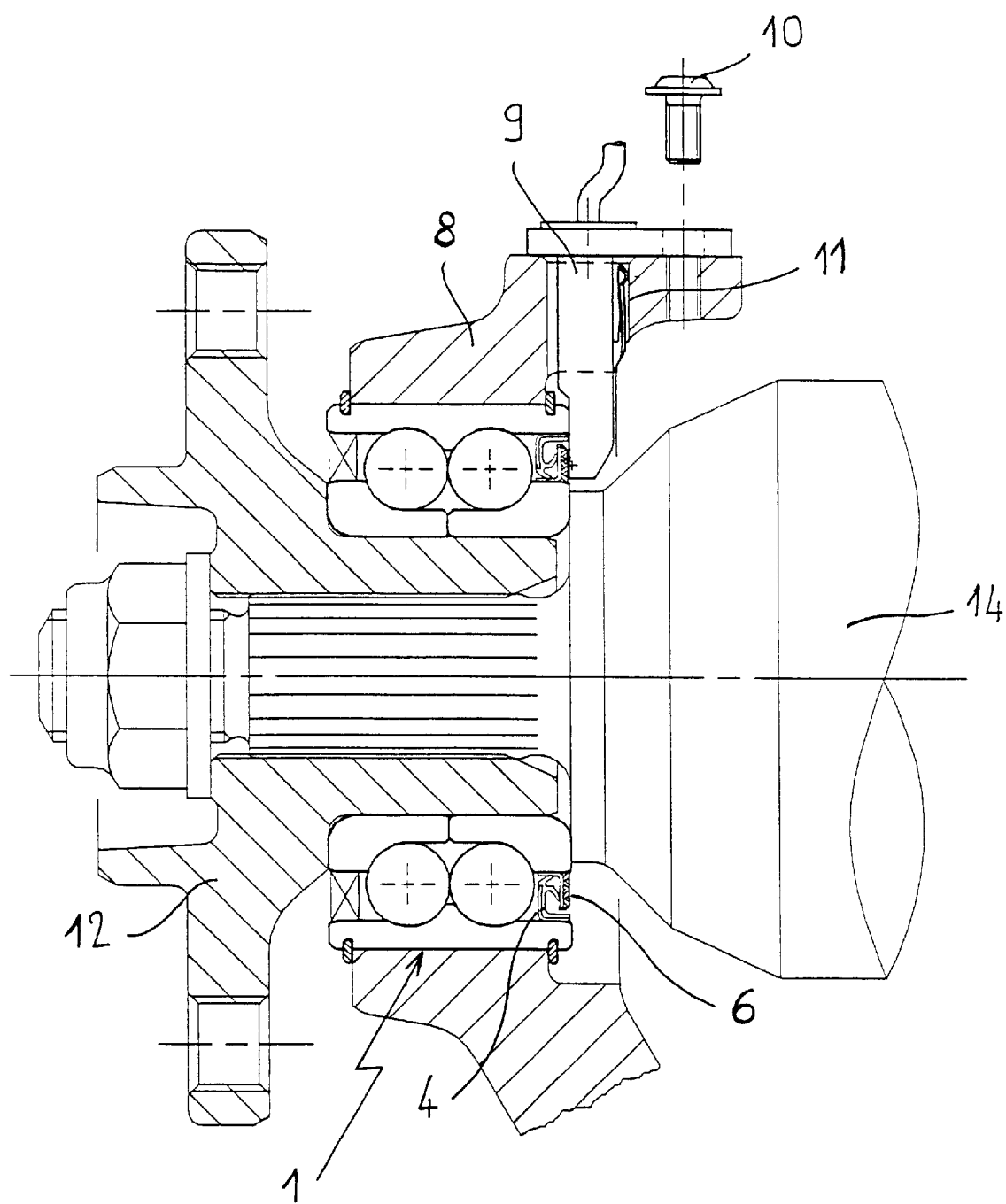
FIG. 1 is an axial cross section of the hub of an automobile wheel equipped with a roller bearing, which is itself equipped with a device to measure rotation comprising a magnetic encoder and a sensor.

Referring now to the drawings, FIG. 1 illustrates a roller bearing mounted on wheel hub 12 that is connected to drive shaft 14 by internal splines. The roller bearing consists of outer ring 1 that is mounted in the bore of fixed stub-axle casing 8, with its conventional watertight seal 4. This watertight seal 4, as described in patent pending FR-A-9300458 filed under the applicant's name, has magnetic encoder 6 located on the plane of the end face of outer ring 1.

Magnetic encoder 6 consists of a ferromagnetic frame onto which is molded an elastomer charged with magnetized particles along successive north and south magnetic poles. Stub-axle casing 8 has a sensor illustrated as speed detector device 9—a Hall-effect type of device, for example—attached by means of screw 10 onto housing 11, located near magnetic encoder 6 and designed to provide speed data upon the rotation of magnetic encoder 6.

Figure 2:
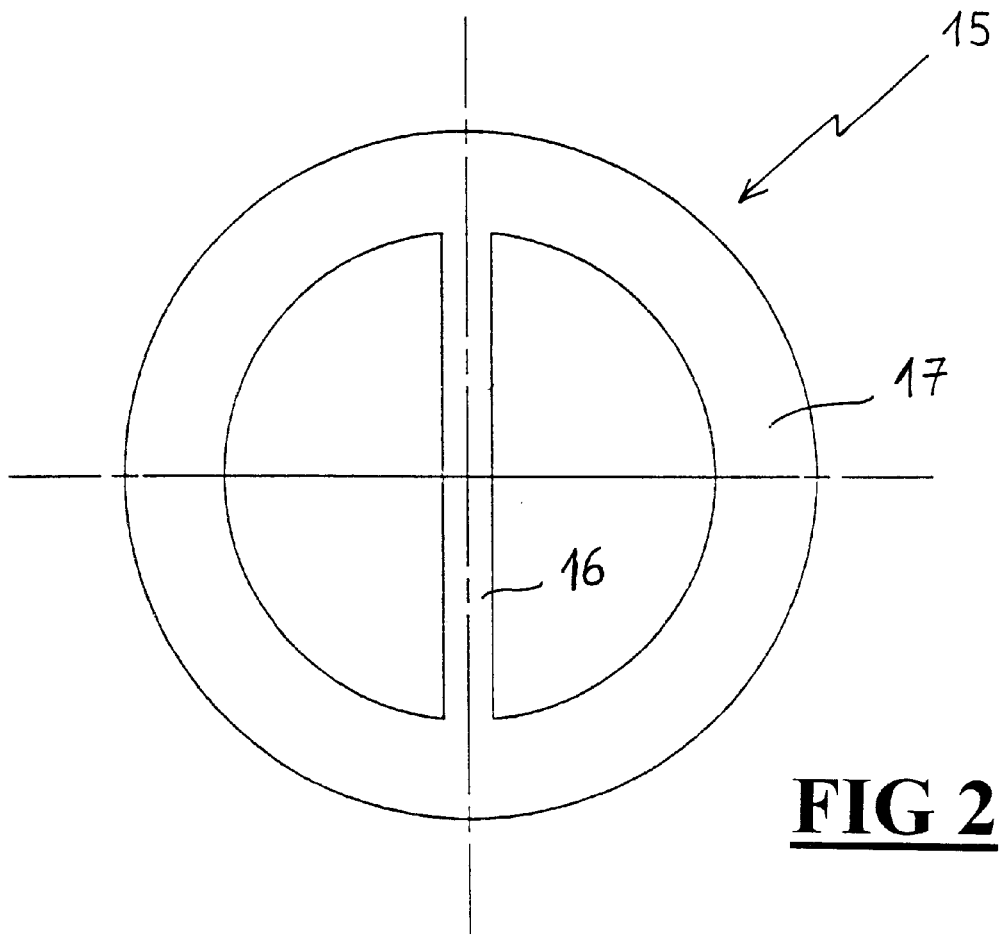
FIG. 2 is a front view of a protective device for a magnetic encoder illustrating a first embodiment of the present invention, shown by itself and designed to be attached to the magnetic encoder illustrated in FIG. 1.

FIG. 2 shows a first embodiment of a protective device according to the invention, which is designed to protect magnetic encoder 6 and, specifically, to prevent the deposit of particles on the active face of magnetic encoder 6 in phases preliminary to the assembly onto outer ring 1 according to FIG. 1. The protective device comprises a protective element 15 having a ring-shaped body 17 whose outer diameter is at most equal to the outer diameter of outer ring 1 and whose interior diameter is at least equal to the interior diameter of outer ring 1, which is designed to be attached to the active face of magnetic encoder 6. Protective element 15 has a tab 16 that connects two diametrically opposed points of ring-shaped body 17 and is used by an operator as a means to grasp protective element 15.

Figure 3:
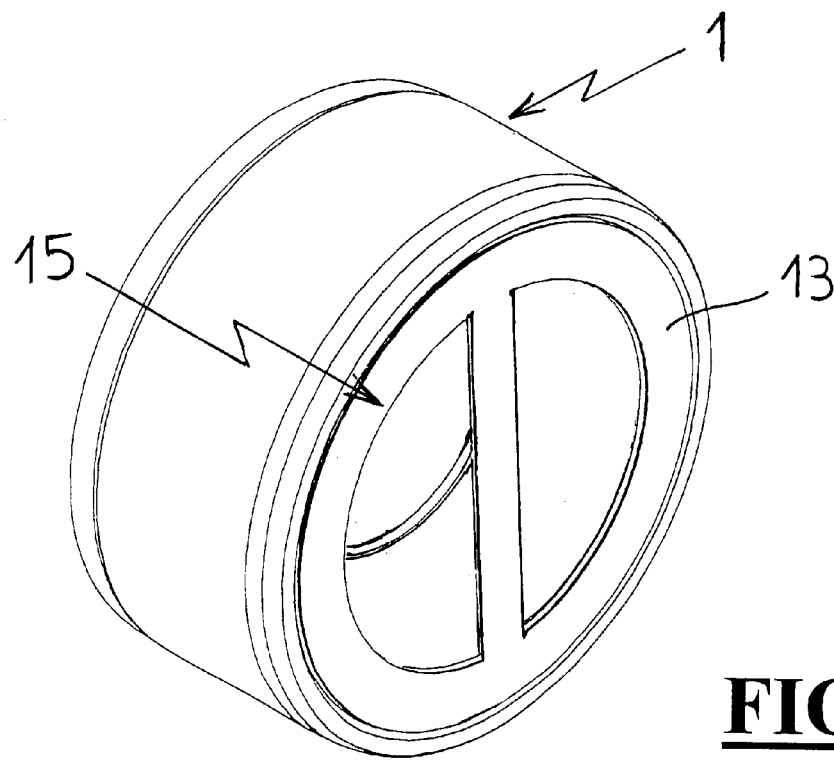
FIG. 3 is a front view of the protective device of FIG. 2 after it has been placed on the outer ring of the roller bearing of FIG. 1.

Such a protective device, when it is attached to magnetic encoder 6 as shown in FIG. 3, prevents the deposit of particles on the active face of magnetic encoder 6 and protects magnetic encoder 6 from shock. Moreover, the thickness of protective element 15 is designed to reduce or even neutralize the magnetic field generated by outer face 13 of protective element 15, which is not in contact with magnetic encoder 6, thereby reducing or eliminating any magnetic attraction exerted on ferromagnetic particles present in the environment. Protective element 15 is preferably made of a ferromagnetic material, such as steel, in order for it to be magnetically attracted by magnetic encoder 6, although it may also be made of a metal-plated support or one that is charged with ferromagnetic particles.

It is easy for an operator to attach protective element 15 as described to magnetic encoder 6 during the manufacture of instrument-equipped outer ring 1 in order to protect magnetic encoder 6 during the various phases of handling and shipment of instrument-equipped outer ring 1. Protective element 15 is then removed from outer ring 1 by manually pulling on tab 16 after the roller bearing is mounted in stub-axle casing 8 and before the insertion of drive shaft 14 through outer ring 1. Tab 16 that is used to grasp protective element 15 also serves as a tamper-proof device, preventing the insertion of drive shaft 14 and also making it impossible to forget to remove protective element 15.

Outer face 13 of protective element 15 may advantageously be coated with an adhesive in order to prevent any particles that are magnetically attracted to it from dispersing upon removal of protective element 15, and being deposited onto magnetic encoder 6.

Figure 4:
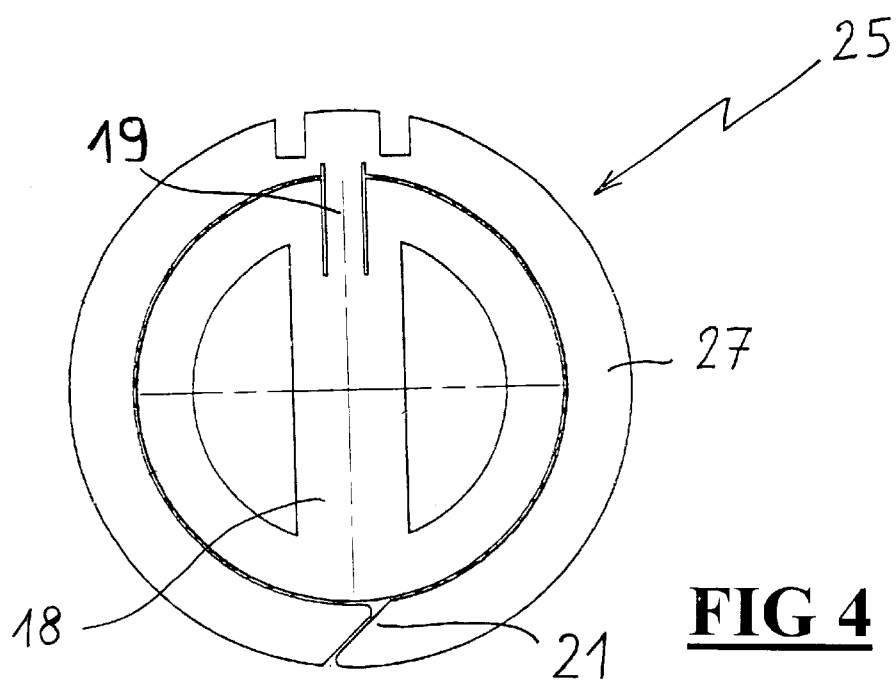
FIG. 4 is a front view of a protective device for a magnetic encoder illustrating a second embodiment of the present invention, which is designed to be attached to the magnetic encoder illustrated in FIG. 1.

FIG. 4 shows a second embodiment of the protective device according to the invention. The device includes, similarly to the first embodiment, protective element 25 made of a ferromagnetic material, comprising a ring-shaped body 27 whose outer diameter is equal to the outer diameter of the outer collar of outer ring 1, and whose inner diameter is equal to the inner diameter of magnetic encoder 6. Ring-shaped body 27 has an oblique opening 21, diametrically opposed to tab 19 that runs radially with respect to the center of protective element 25, and has circular head 18 that fits inside the inner diameter of ring-shaped body 27.

Figure 5:
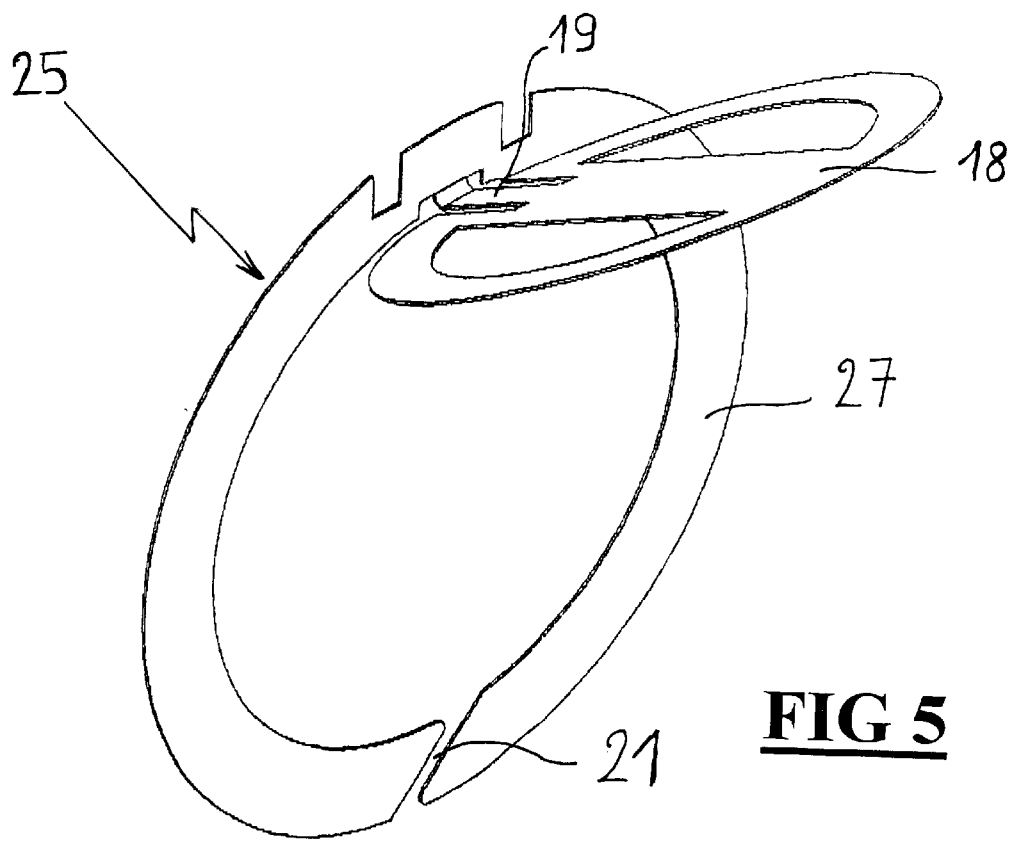
FIG. 5 is a perspective view of the protective device of FIG. 4 in an open configuration to permit the passage of a rotating element.

Like the first embodiment, such a protective element 25 may be easily attached and magnetically held to the active face of magnetic encoder 6 during the manufacture of instrument-equipped outer ring 1, for example. This variant embodiment has the advantage of permitting protective element 25 to remain on magnetic encoder 6 during assembly of the measuring device shown in FIG. 1. In fact, as you can see in FIG. 5, tab 19 on protective element 25 is designed to be able to fold back by pulling on head 18 so as to open the center of ring-shaped body 27.

Figure 6:
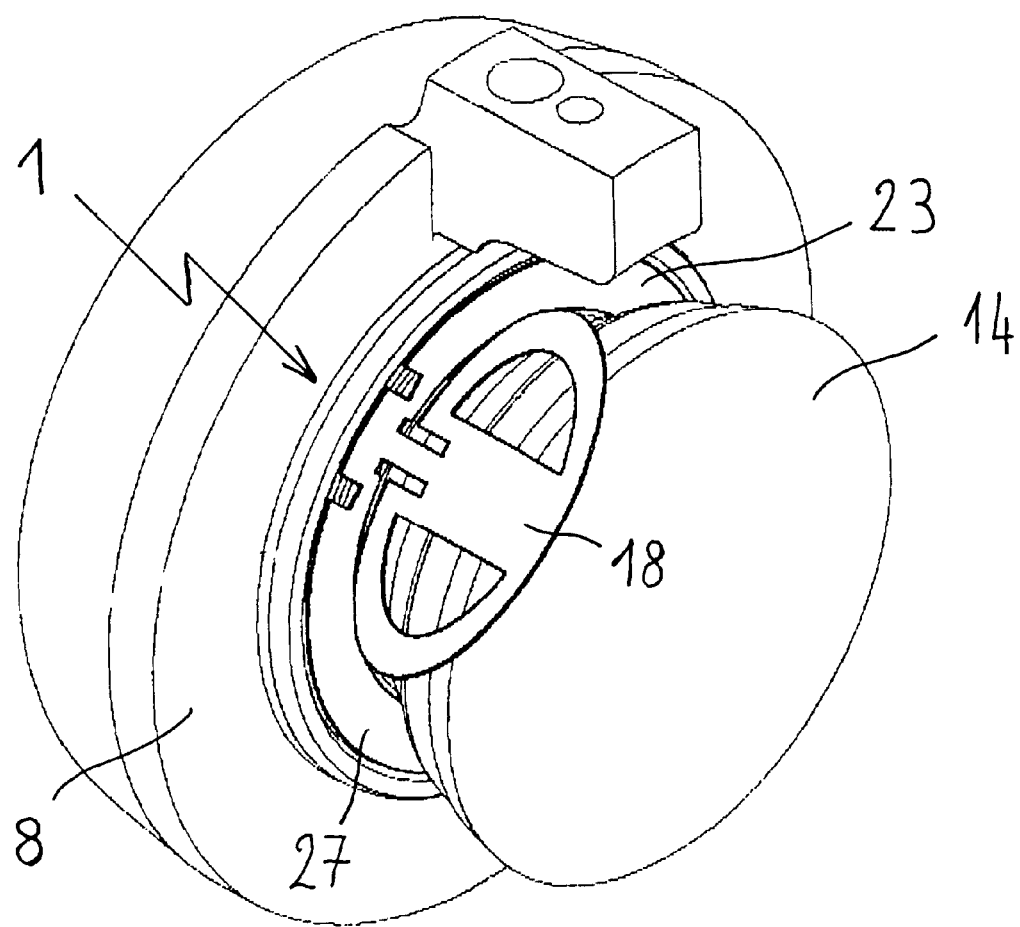
FIG. 6 is a perspective view of the protective device of FIG. 4 after it has been placed on the outer ring of the roller bearing of FIG. 1.

Accordingly, assembly of the measurement device may be carried out with protective element 25 still attached to outer ring 1 by folding back tab 19 by pulling head 18 away and outside of ring-shaped body 27, so as to permit the insertion of drive shaft 14 through outer ring 1 as shown in FIG. 6. Protective element 25 is therefore not removed until after the measuring device is fully assembled. Specifically, protective element 25 is maintained in place against the active face of magnetic encoder 6 during the placement of sensor 9 in its housing 11 in order to prevent any filings—resulting, for instance, from the machining of housing 11—from being released upon the insertion of sensor 9 and attracted to magnetic encoder 6.

Removal of protective element 25 is simple to do once the measuring device has been assembled, by pulling head 18 in a radial direction, thereby causing deformation of ring-shaped body 27 at opening 21, which allows protective element 25 to be removed. Advantageously, outer surface 23 of protective element 25, which is not in contact with magnetic encoder 6, is coated with an adhesive, thereby causing any particles deposited on the outer surface 23 to adhere to it during the removal of protective element 25 from magnetic encoder 6.

Due to the configuration according to the present invention, and regardless of the embodiment variant, the magnetic encoder may be protected during the shipping and assembly phases, thereby reducing any risk of the deposit of particles, such as the filings that are always present in assembly plants. The use and manufacture of the configuration of the present invention is simple and economical, making this is a simple and inexpensive way to significantly increase the precision of measurement devices using such magnetic encoders.

It is to be understood, of course, that the invention is not limited to the modes of embodiment described and illustrated, which are given by way of example, only.

What is claimed is:

1. An encoder assembly comprising:
   a magnetic encoder having an active face designed to work with a sensor to measure the rotation of a rotating element; and
   a protective device comprising:
      a protective element having a body with an opening therethrough and configured to substantially cover the active face of the magnetic encoder, the body including magnetic material such that the protective element adheres to the magnetic encoder by magnetic attraction; and
      a tab integral with the body and extending radially through the opening of the protective element in order to prevent the insertion of an element through the opening without first removing the protective element.

2. An encoder assembly according to claim 1, wherein the protective element has a thickness designed to neutralize a magnetic field resulting from a face of the protective element which is not in contact with the magnetic encoder.

3. An encoder assembly according to claim 1, wherein the protective element is made of a ferromagnetic plate.

4. An encoder assembly according to claim 1, wherein the protective element is comprised of a support charged with ferromagnetic particles.

5. An encoder assembly according to claim 1, wherein the protective element has a ring-shaped body designed to fit on a magnetic encoder carried on a bearing outer ring.

6. An encoder assembly according to claim 1, wherein the outer surface of the protective element located opposite the face in contact with the active face of the encoder element is coated with an adhesive.

7. An encoder assembly comprising:
   a magnetic encoder having an active face designed to work with a sensor to measure the rotation of a rotating element; and
   a protective device comprising:
      a protective element to be placed on the active face of the magnetic encoder, the protective element including magnetic material such that the protective element adheres to the magnetic encoder by magnetic attraction; and
      a tab that extends radially through the center of the protective element in order to prevent the insertion of an element without first removing the protective element wherein the protective element is made of a metal-plated support, the support being made of a nonmagnetic material.

8. An encoder assembly comprising:
   a magnetic encoder having an active face designed to work with a sensor to measure the rotation of a rotating element; and
   a protective device comprising:
      a protective element having a body with an opening therethrough and configured to substantially cover the active face of the magnetic encoder, the body including magnetic material such that the protective element adheres to the magnetic encoder by magnetic attraction; and
      a tab integral with the body and extending radially toward the interior of the opening, the tab having a head configured to be grasped by an operator, with the tab configured to fold back in such a way as to permit the insertion of an element without having to remove the protective element.

* * * * *